(12) United States Patent
Ohashi

(10) Patent No.: US 9,647,566 B2
(45) Date of Patent: May 9, 2017

(54) SWITCHING POWER SUPPLY APPARATUS

(71) Applicant: FUJI ELECTRIC CO., LTD., Kawasaki-shi (JP)

(72) Inventor: Hidetomo Ohashi, Matsumoto (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 1 day.

(21) Appl. No.: 14/483,591

(22) Filed: Sep. 11, 2014

(65) Prior Publication Data
US 2014/0376275 A1    Dec. 25, 2014

Related U.S. Application Data

(63) Continuation of application No. PCT/JP2013/072477, filed on Aug. 22, 2013.

(30) Foreign Application Priority Data

Aug. 27, 2012 (JP) ................. 2012-187071

(51) Int. Cl.
*H02M 3/335* (2006.01)
*H02M 1/38* (2007.01)
(Continued)

(52) U.S. Cl.
CPC ......... *H02M 3/33523* (2013.01); *H02M 1/38* (2013.01); *H02M 1/08* (2013.01);
(Continued)

(58) Field of Classification Search
CPC ........... H02M 3/3376; H02M 3/33507; H02M 3/33592; H02M 3/33523; H02M 3/53871; Y02B 70/1433
(Continued)

(56) References Cited

U.S. PATENT DOCUMENTS

| 5,886,884 A | 3/1999 | Baek et al. |
| 6,018,467 A * | 1/2000 | Majid ............... H02M 3/33523 363/16 |

(Continued)

FOREIGN PATENT DOCUMENTS

| CN | 101686015 A | 3/2010 |
| CN | 101796708 A | 8/2010 |

(Continued)

OTHER PUBLICATIONS

Patent Translate, Description JP2003134817.*
(Continued)

*Primary Examiner* — Nguyen Tran
(74) *Attorney, Agent, or Firm* — Rossi, Kimms & McDowell LLP

(57) ABSTRACT

A switching power supply apparatus includes: a dead time circuit that receives an output control signal and generates dead time signal to specify a time width when both first and second switching elements are turned OFF; an output signal generation circuit that generates first and second output signals which specify the ON time of the first and second switching elements respectively in accordance with the output control signal and the dead time signal; and a dead time adjustment circuit that adjusts the turn ON timings of the first and second switching elements by changing the time width of the dead time signal in accordance with the change of voltage of the DC input power or the change of the output voltage of the capacitor.

6 Claims, 18 Drawing Sheets

(51) Int. Cl.
*H02M 1/00* (2006.01)
*H02M 1/08* (2006.01)

(52) U.S. Cl.
CPC .... *H02M 3/33553* (2013.01); *H02M 3/33569* (2013.01); *H02M 2001/0058* (2013.01); *Y02B 70/1491* (2013.01)

(58) Field of Classification Search
USPC .. 363/17, 21.02, 21.03, 21.12–21.18, 97, 98
See application file for complete search history.

(56) References Cited

U.S. PATENT DOCUMENTS

| | | | | |
|---|---|---|---|---|
| 7,282,682 | B2* | 10/2007 | Suenaga | H05B 6/666 219/715 |
| 7,391,194 | B2 | 6/2008 | Brown | |
| 8,817,498 | B2* | 8/2014 | Choi | H02M 3/3387 363/131 |
| 2001/0036085 | A1 | 11/2001 | Narita | |
| 2002/0075700 | A1 | 6/2002 | Birumachi | |
| 2009/0010035 | A1 | 1/2009 | Williams | |
| 2009/0146630 | A1 | 6/2009 | Naka | |
| 2012/0033455 | A1* | 2/2012 | Hosotani | H02M 1/38 363/21.03 |
| 2013/0010502 | A1* | 1/2013 | Chen | H02M 3/3387 363/21.02 |

FOREIGN PATENT DOCUMENTS

| | | |
|---|---|---|
| JP | 03112361 A | 5/1991 |
| JP | 10136647 A | 5/1998 |
| JP | 11275866 A | 10/1999 |
| JP | 2002101655 A | 4/2002 |
| JP | 2003134817 A | 5/2003 |
| JP | 2005261091 A | 9/2005 |
| JP | 2007151271 A | 6/2007 |
| JP | 2007535286 A | 11/2007 |
| JP | 2009141564 A | 6/2009 |
| JP | 2011223065 A | 11/2011 |
| WO | 2014034530 A1 | 3/2014 |

OTHER PUBLICATIONS

International Search Report issued in PCT/JP2013/072477, dated Oct. 8, 2013. English translation provided.

Office Action issued in Chinese Appln. No. 201380014697.1 mailed Apr. 26, 2016. English translation provided.

Office Action issued in Chinese Appln. No. 201380014697.1 mailed Dec. 7, 2016. English translation provided.

* cited by examiner

SWITCHING POWER SUPPLY APPARATUS

CROSS-REFERENCE TO RELATED APPLICATIONS

This application is a continuation of International Application No. PCT/JP2013/072477, filed on Aug. 22, 2013, and is based on and claims priority to Japanese Patent Application No. JP 2012-187071, filed on Aug. 27, 2012. The disclosure of the Japanese priority application and the PCT application in their entirety, including the drawings, claims, and the specification thereof, are incorporated herein by reference.

BACKGROUND

Field of the Invention

Embodiments of the present invention relate to a switching power supply apparatus in which power conversion efficiency has been improved.

Discussion of the Background

A resonance type converter is known as a switching power supply apparatus for use in various electronic equipment. The resonance type converter is constructed by connecting a primary winding of an insulation transformer to a DC voltage source via a capacitor. A DC resonance circuit is formed by a leakage inductor of the insulation transformer and the capacitor. The resonance type converter controls resonance current that flows through the DC resonance circuit balancing the first and second switching elements which are turned ON or OFF, and acquires a DC voltage which is stepped up/down from the secondary wiring side of the insulation transformer.

For example, U.S. Pat. No. 5,886,884 ("Patent Document 1") and U.S. Pat. No. 7,391,194 ("Patent Document 2") propose a soft switching technique in this type of switching power supply apparatus. This soft switching technique decreases loss in the switching element considerably by turning the switching element ON when voltage applied to each switching element is zero or when current that flows to the inductor is zero.

Referring to FIG. 11, in this resonance type switching power supply apparatus 1, the primary winding P1 of the insulation transformer T is connected to the DC voltage source B via the capacitor C, for example, and includes a DC resonance circuit formed by the leakage inductor of the insulation transformer T and the capacitor C. A first switching element Q1, which is connected in series to the primary winding P1 of the insulation transformer T, is turned ON by a drive control circuit A which is excited separately, and applies input voltage Vin from the DC voltage source B to the series resonance circuit. The drive control circuit A is a power supply IC, for example. A second switching element Q2, which is connected to the series resonance circuit in parallel, is turned ON by the drive control circuit A when the first switching element Q1 is OFF, and forms a resonance current path of the series resonance circuit. The first and second switching elements Q1 and Q2 are high withstand voltage n-type MOS-FETs, for example.

Power generated in the secondary windings S1 and S2 of the insulation transformer T is rectified and smoothed via an output circuit, which is constituted by diodes D1 and D2 and an output capacitor Cout, and is supplied to a load (not illustrated) as the output voltage Vout. A resonance type power converter main unit is constituted by these circuit units. The output voltage Vout, specifically the deviation of the output voltage Vout and an output voltage set value, is detected by an output voltage detection circuit VS, and is fed back to the drive control circuit A via a photocoupler PC as FB voltage.

The FB voltage fed back to the drive control circuit A is used for pulse width modulation of an output control signal which turns the first and second switching elements Q1 and Q2 ON/OFF, so as to stabilize the output voltage Vout. The DC power supplied from the DC voltage source B is normally filtered via the input capacitor Cin, and is then supplied as input voltage Vin to the switching power supply apparatus.

FIG. 12 shows the general configuration, where the drive control circuit A is comprised primarily of an output control circuit 2, a dead time circuit 3 and a drive signal generation circuit 4. The output control circuit 2 is constituted by a PWM control circuit that generates, as a PWM signal, an output control signal having a pulse width corresponding to the FB voltage which is fed back from the output voltage detection circuit VS, for example. Instead of the PWM signal, the output control circuit 2 may generate a pulse signal having a frequency in accordance with the FB voltage (PFM signal) as the output control signal.

If the output control signal is received, the dead time circuit 3 generates a dead time signal which turns the first and second switching elements Q1 and Q2 ON when the voltage applied to the first and second switching elements Q1 and Q2 is zero. The drive signal generation circuit 4 generates a drive signal of which pulse width is controlled to turn the first and second switching elements Q1 and Q2 ON in accordance with the dead time signal and the output control signal.

In FIG. 12, reference numeral 5 denotes a drive amplifier as a drive circuit that generates LO terminal output to drive the first switching element Q1 on the low side, in accordance with the drive signal outputted by the drive signal generation circuit 4. Reference numeral 6 denotes a drive amplifier as a drive circuit that generates HO terminal output to drive the second switching element Q2 on the high side by inputting the drive signal outputted by the drive signal generation circuit 4 to a level shift circuit 7. Reference numeral 8 denotes an internal power supply circuit that generates voltage VDD required for operation of the output control circuit 2, the dead time circuit 3 and the drive signal generation circuit 4, from the drive voltage VCC that is applied to the drive control circuit A.

Now the operation of the resonance type converter, which is the switching power supply apparatus having the above configuration, will be described in brief. In this resonance type converter, when the second switching element Q2 is in the OFF state, current flows to the series resonance circuit by turning the first switching element Q1 ON. If the first switching element Q1 is turned OFF in this state, a parasitic capacitor (not illustrated) of the first switching element Q1 is charged by the current flowing to the inductor of the series resonance circuit. At the same time, a parasitic capacitor (not illustrated) of the second switching element Q2 is discharged by this current.

By turning the second switching element Q2 ON when the charging voltage of the parasitic capacitor of the first switching element Q1 reaches the input voltage Vin, zero voltage switching of the second switching element Q2 is implemented. As the second switching element Q2 is turned ON here, power energy stored in the capacitor C flows through the second switching element Q2. As a result, the current that flows to the inductor of the series resonance circuit is inverted.

If the second switching element Q2 is turned OFF, the parasitic capacitor of the second switching element Q2 is charged by the above mentioned inverted current. At the same time, the parasitic capacitor of the first switching element Q1 is discharged by this current. By turning the first switching element Q1 ON when the voltage charged in the parasitic capacitor of the second switching element Q2 reaches zero voltage, zero voltage switching of the first switching element Q1 is implemented. By turning the first switching element Q1 ON like this, the current of the series resonance circuit is inverted and flows through the first switching element Q1 again.

The above mentioned dead time signal is used for specifying the turn ON timing of one of the first and second switching elements Q1 and Q2 based on the turn OFF timing of the other switching elements Q2 and Q1.

SUMMARY

As shown in FIG. 13, the dead time circuit 3 includes, for example, a charge/discharge capacitor Cdt, which is charged by a constant current source Ichg via a charge switch Qchg, and a discharge switch Qdis, which discharges electric charges charged in the charge/discharge capacitor Cdt. The charge switch Qchg and the discharge switch Qdis are respectively constituted by a p-type MOS-FET and an n-type MOS-FET of which ON and OFF are balance-controlled by the output control signal outputted from the output control circuit 2. The dead time circuit 3 is configured such that a comparator CP compares the charge/discharge voltage Vcd of the charge/discharge capacitor Cdt and a threshold voltage Vdt which is set in advance, and this output and the output control signal are logically processed in an NOR circuit NOR, so as to generate the dead time signal described above.

In concrete terms, as the operation waveforms in FIG. 14 show, the dead time circuit 3 charges the charge/discharge capacitor Cdt when the output control signal is [L], for example, and inverts the output of the comparator CP to [H] when the charge/discharge voltage Vcd exceeds the threshold voltage Vdt. The dead time circuit 3 also discharges the electric charges charged in the charge/discharge capacitor Cdt when the output control signal is [H], and inverts the output of the comparator CP to [L] when the charge/discharge voltage Vcd of the charge/discharge capacitor Cdt becomes less than the threshold voltage Vdt. By logically processing the output of the comparator CP due to the charge/discharge of the charge/discharge capacitor Cdt and the output control signal using the NOR circuit NOR, the dead time circuit 3 generates a dead time signal having a predetermined pulse width Tdt.

After the switching element Q1 (Q2) turns OFF, the delay time until the voltage applied to the switching element Q2 (Q1) becomes zero primarily depends on the parasitic capacitance of the switching elements Q1 and Q2 and the input voltage Vin. Whereas the pulse width Tdt of the dead time signal is fixedly determined by the capacitance of the charge/discharge capacitor Cdt, the charge current of the charge/discharge capacitor Cdt, and the threshold voltage Vdt which is set in the comparator CP.

On the other hand, because of age-based deterioration and the dispersion of component characteristics constituting the switching power supply apparatus, the input voltage Vin may be changed, which may result in a change in the output voltage Vout and a change in the FB voltage. Therefore in order to determine the pulse width Tdt of the dead time signal, it is necessary to include the estimated fluctuation range of the input voltage Vin due to dispersion of the components of the apparatus or the like. However, in reality, deviation is still generated between the charge/discharge time of the parasitic capacitor of the switching elements Q1 or Q2, which depends on the DC input voltage Vin, and the pulse width Tdt of the dead time signal which is fixedly set, as mentioned above.

If the input voltage Vin is lower than the voltage predetermined in the specification, for example, the charge/discharge time of the parasitic capacitor of the switching element Q1 or Q2 decreases accordingly. Then, as shown in FIG. 15, the switching element Q1 or Q2 is turned ON at a timing later than the timing when the voltage applied to the switching element Q1 or Q2 becomes zero. As a result, an invalid time of power conversion increases, hence the current peak extends and loss in the switching element Q1 or Q2 increases, which results in a drop in power conversion efficiency.

If the input voltage Vin is higher than the voltage predetermined in the specification, on the other hand, the charge/discharge time of the parasitic capacitor of the switching element Q1 or Q2 increases accordingly. Then, as shown in FIG. 16, the switching element Q1 or Q2 is turned ON before the voltage applied to the switching element Q1 or Q2 reaches zero, because the dead time signal dissipates by then. As a result, not only is the zero voltage switching disabled, but loss in the switching element Q1 or Q2 increases as well, which results in a drop in power conversion efficiency.

In the same manner, if the output voltage Vout is higher than the voltage predetermined in the specification, the FB voltage fed back to the drive control circuit A becomes higher than the specification accordingly, and the pulse width of the output control signal generated by the output control circuit 2 increases. Then, as shown in FIG. 17, the switching element Q1 or Q2 is turned ON at a timing later than the timing than when the voltage applied to the switching element Q1 or Q2 becomes zero, because output of the dead time signal continues even at a timing when the voltage becomes zero. As a result, an invalid time of power conversion increases, the current peak extends and loss in the switching element Q1 or Q2 increases, which results in a drop in power conversion efficiency.

If the output voltage Vout is lower than the voltage predetermined in the specification, on the other hand, the FB voltage becomes lower than the specification accordingly, and the pulse width of the output control signal generated by the output control circuit 2 decreases. Then, as shown in FIG. 18, the switching element Q1 or Q2 is turned ON before the voltage applied to the switching element Q1 or Q2 reaches zero, because the dead time signal dissipates by then. As a result, not only is zero voltage switching disabled, but loss in the switching element Q1 or Q2 increases as well, which results in a drop in power conversion efficiency.

Embodiments of the present invention provide a switching power supply apparatus having a simple configuration that can implement zero voltage switching by appropriately setting the turn ON timings of the first and second switching elements regardless of the fluctuation of DC input voltage Vin, and can therefore prevent a drop in conversion efficiency.

A switching power supply apparatus according to an embodiment of the present invention includes: a resonance type power converter main unit that obtains DC output power by a first switching element which switches DC input power and stores the power in an inductor, and a second switching element which transfers the power stored in the inductor to an output capacitor in use of resonance of the inductor; a drive control circuit that resonates the inductor by alternately turning the first and second switching elements ON/OFF; and a feedback circuit that controls the operation of the drive control circuit by detecting the output voltage of the output capacitor, and feeding back the detected information to the drive control circuit. Particularly in the switching power supply apparatus according to the present invention, the drive control circuit includes: an output control circuit that generates an output control signal having a pulse width in accordance with the detected information fed back from the feedback circuit; a dead time circuit that, on the basis of a turn OFF timing of one of the first and second switching elements, generates a dead time signal to specify a turn ON timing of the other one of the switching elements, on the basis of the output control signal; an output signal generation circuit that generates first and second output signals for specifying the ON time of the first and second switching elements respectively in accordance with the output control signal and the dead time signal; and a dead time adjustment circuit that adjusts a turn ON timings of the first and second switching elements by changing a time width of the dead time signal in accordance with the change of the voltage of the DC input power or the change of the output voltage of the capacitor.

Here the resonance type power converter main unit is constituted by a resonance type converter, for example, includes: a series resonance circuit that is formed by a leak inductor of an insulation transformer and a capacitor, with a primary winding of the insulation transformer being connected to a DC voltage source via the capacitor; a first switching element that applies input voltage from the DC voltage source to the series resonance circuit when the first switching element is turned ON by the drive control circuit; a second switching element that is connected to the series resonance circuit in parallel, and is turned ON by the drive control circuit when the first switching element is OFF, so as to form a current path of the series resonance circuit; a diode that rectifies power generated on a secondary winding side of the insulation transformer; and an output capacitor that smooths the power rectified via the diode and outputs the power.

Or the resonance type power converter main unit is constituted by a synchronous rectification boost converter, for example, that includes: a first switching element that is connected to a DC voltage source via a reactor for resonance to the DC voltage source via the reactor for resonance, and applies input voltage from the DC voltage source to the reactor for resonance when the first switching element is turned ON by the drive control circuit; and a second switching element that is turned ON by the drive control circuit when the first switching element is OFF, so as to transfer power energy stored in the reactor for resonance to an output capacitor.

The output signal generation circuit may be configured so as to generate a first output signal having a pulse width with which the fall of the dead time signal, when the output control signal is OFF, is an ON trigger, and the rise of the output control signal is an OFF trigger. The output signal generation circuit is also configured so as to generate a second output signal having a pulse width with which the fall of the dead time signal, when the output control signal is ON, is an ON trigger, and the rise of the output control signal is an OFF trigger.

The dead time circuit may be configured so as to include a comparator that compares a charge voltage of a capacitor, which is charged when the output control signal is OFF, with a comparative reference voltage, and generates a dead time signal having a pulse width corresponding to a period from a fall timing of the output control signal to a timing when the output signal of the comparator is inverted. The dead time adjustment circuit may also be configured so as to change the pulse width of the dead time signal by adjusting the charge current of the capacitor in accordance with the change of the input voltage or the change of the output voltage.

In concrete terms, the dead time adjustment circuit sets the pulse width of the dead time signal to be longer by decreasing the charge current of the capacitor when the input voltage is high. The dead time adjustment circuit also sets the pulse width of the dead time signal to be shorter by increasing the charge current of the capacitor when the input voltage is low. Or the dead time adjustment circuit sets the pulse width of the dead time signal to be shorter by increasing the charge current of a capacitor when the output voltage is high, and the FB voltage is increased accordingly. The dead time adjustment circuit also sets the pulse width of the dead time signal to be longer by decreasing the charge current of the capacitor when the output voltage is slow, and the FB voltage is decreased accordingly.

According to the switching power supply apparatus according to the above configuration, the pulse width of the dead time signal generated by the dead time circuit is adjusted by the dead time adjustment circuit in accordance with the change of the input voltage or the change of the output voltage, even if the input voltage changes due to the age-based deterioration of component of the apparatus or dispersion of component characteristics, or even if the output voltage and the FB voltage change as the input voltage changes. Therefore, the first or second switching element can be turned ON at a timing when the voltage applied to the switching element becomes zero, regardless the change of the input voltage or the output voltage.

As a consequence, zero voltage switching of the switching element can be easily and effectively implemented, and a drop in conversion efficiency can be prevented. Particularly such a problem as extension of the current peak, due to the increase of invalid time of power conversion caused by temperature dependency or age-based deterioration of components of the apparatus or by dispersion of component characteristics, can be prevented, and a drop in power conversion efficiency, due to the increase of loss in the switching element, can also be prevented. Further, the dead time adjustment circuit is included, therefore designing the dead time, considering the fluctuation width of the input voltage, becomes easier.

DESCRIPTION OF ILLUSTRATED EMBODIMENTS

Embodiments of the switching power supply apparatus according to the present invention will now be described with reference to the drawings.

Figure 1:
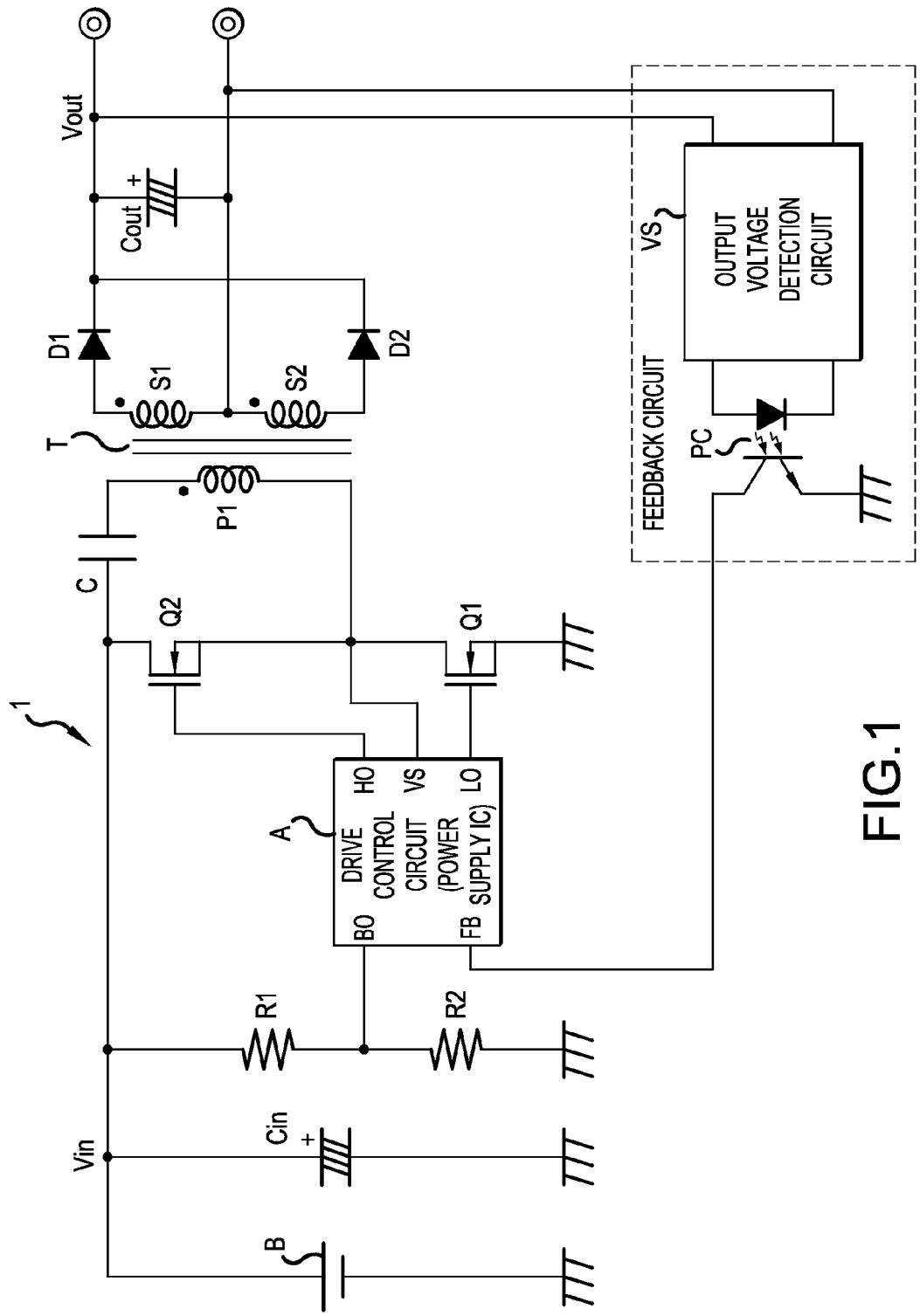
FIG. 1 is a schematic block diagram of a switching apparatus constructing a resonance type converter according to Embodiment 1 of the present invention.
Figure 11:
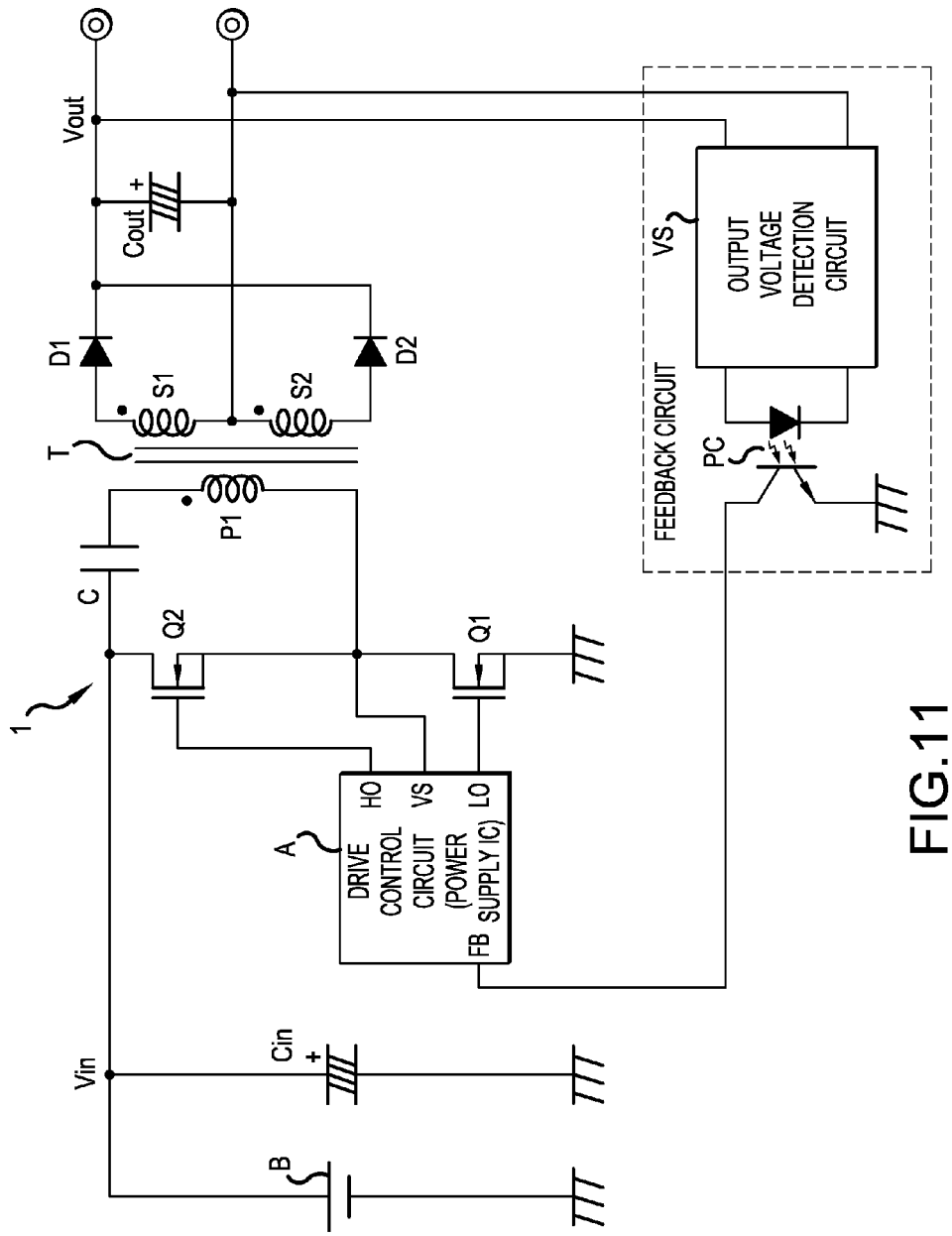
FIG. 11 is a schematic block diagram of a general resonance type switching power supply apparatus of a prior art.

FIG. 1 is a schematic block diagram of a switching power supply apparatus 1 constructing a resonance type converter according to Embodiment 1 of the present invention. In FIG. 1, a composing element the same as the above mentioned conventional switching power supply apparatus 1 shown in FIG. 11 is denoted with a same reference symbol. Redundant description on the configuration of a composing element the same as the conventional apparatus and the functions thereof is therefore omitted.

A characteristic of the switching power supply apparatus 1 according to Embodiment 1 is that input voltage Vin is divided and detected using the voltage dividing resistors R1 and R2, and this detected input voltage Vin is inputted to the drive control circuit A as a BO voltage. Another characteristic is that in the drive control circuit A, the pulse width Tdt of the dead time signal generated by the dead time circuit 3 is adjusted based on the BO voltage.

Figure 2:
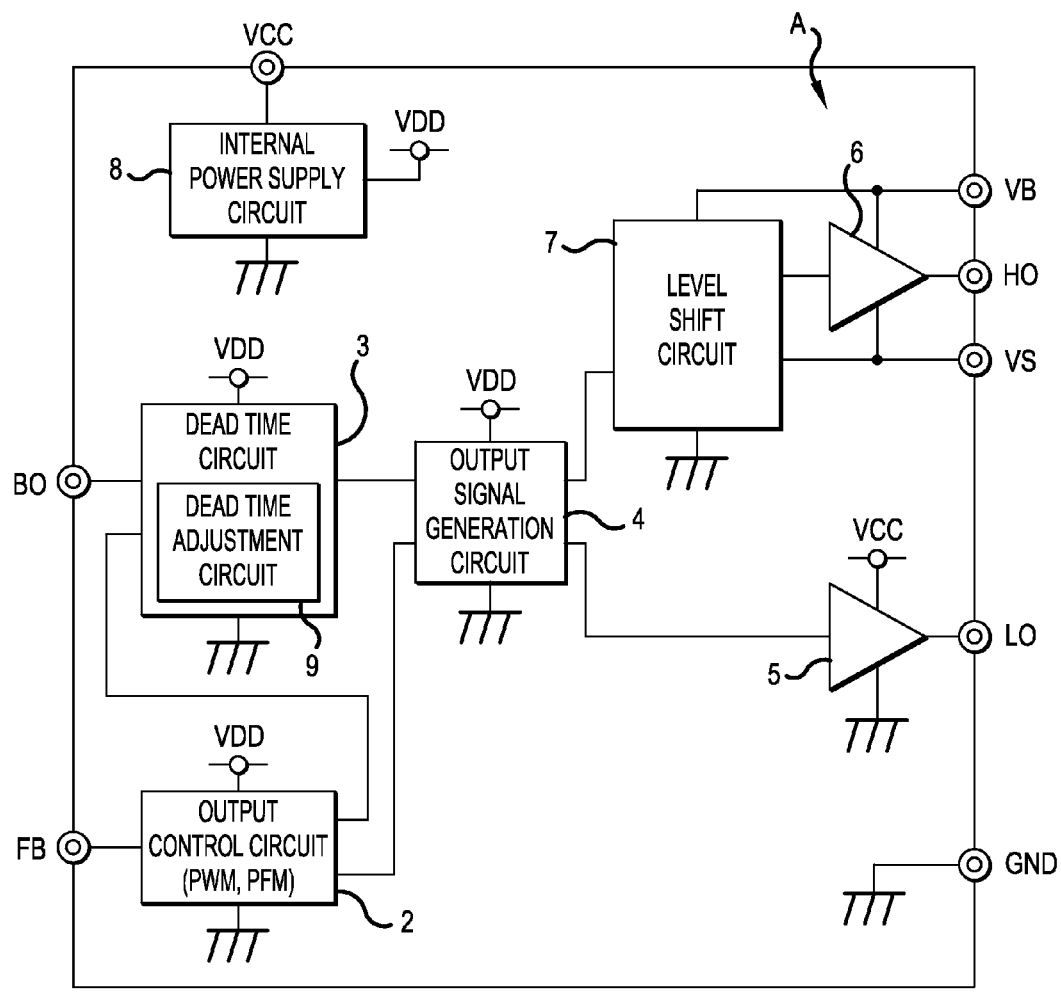
FIG. 2 is a schematic block diagram of a drive control circuit in the switching power supply apparatus shown in FIG. 1.
Figure 12:
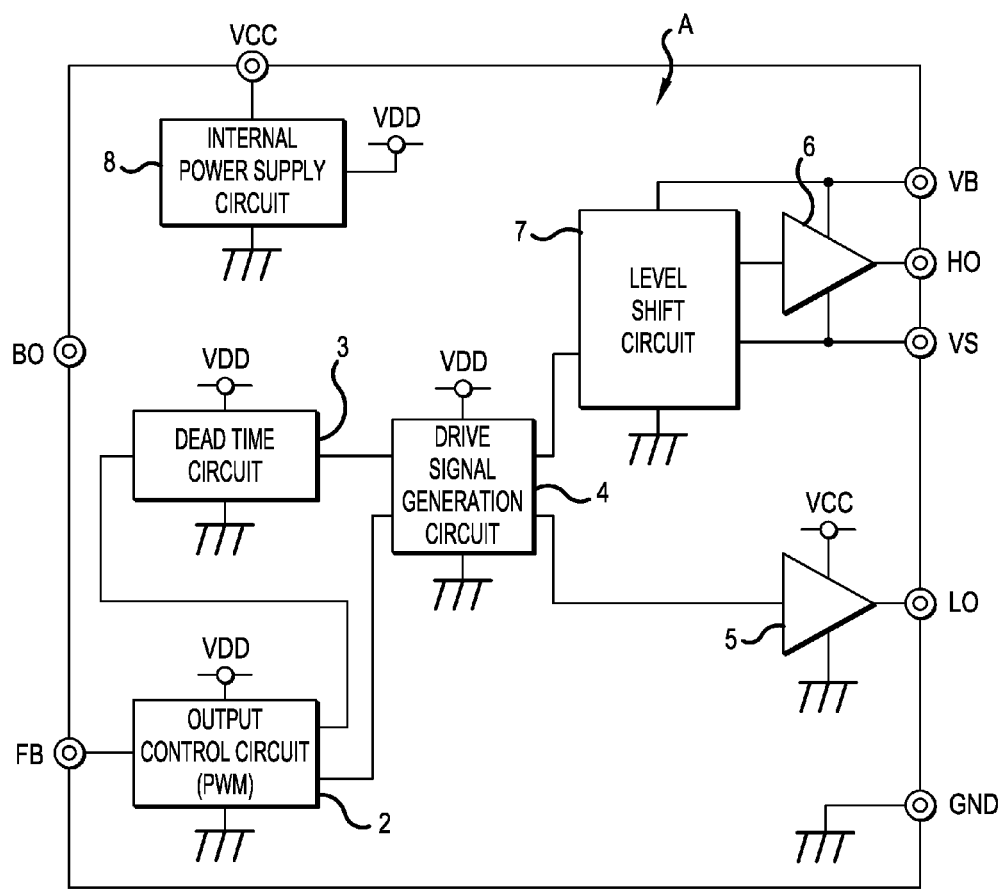
FIG. 12 is a schematic block diagram of a drive control circuit in the switching power supply apparatus shown in FIG. 11.
Figure 13:
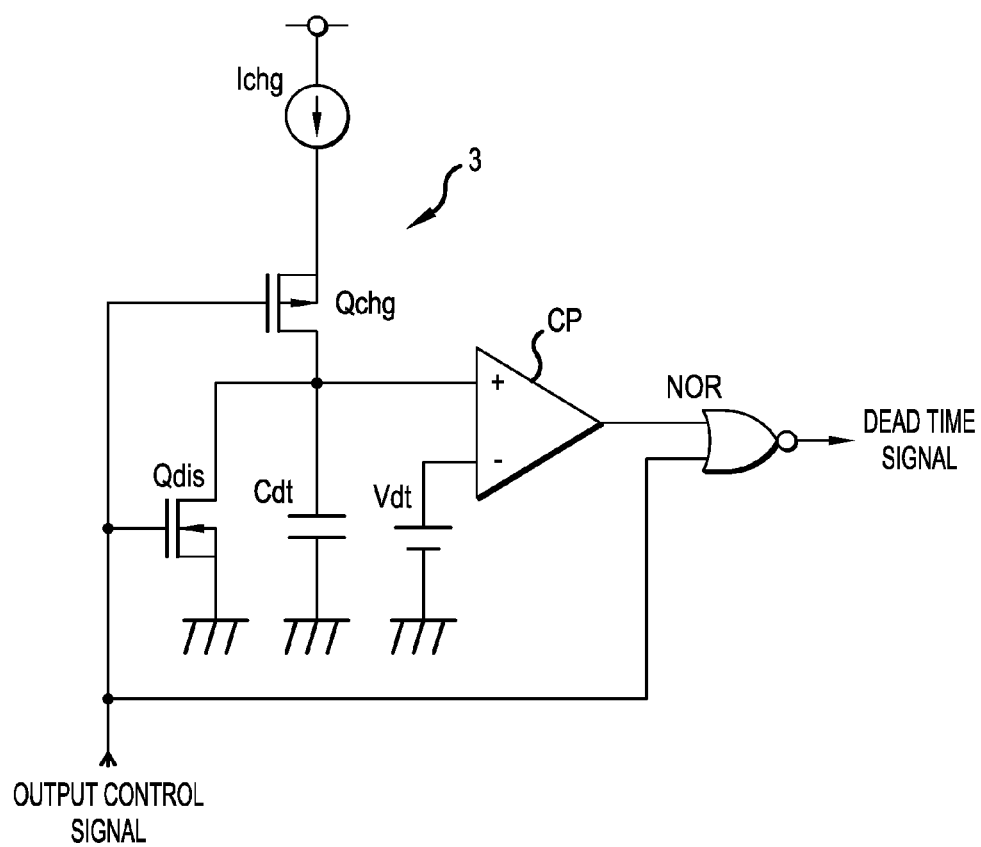
FIG. 13 is a diagram depicting a configuration example of a dead time circuit in the drive control circuit shown in FIG. 12.
Figure 14:
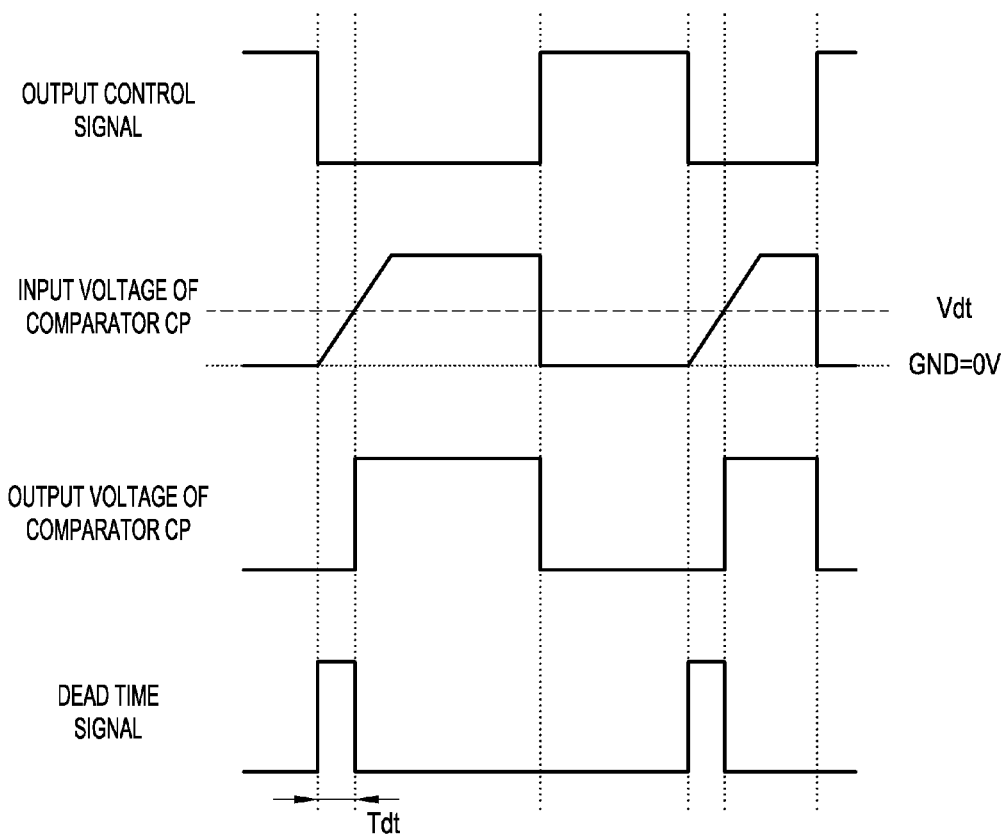
FIG. 14 is a signal waveform diagram for describing operation of the dead time circuit shown in FIG. 13.
Figure 15:
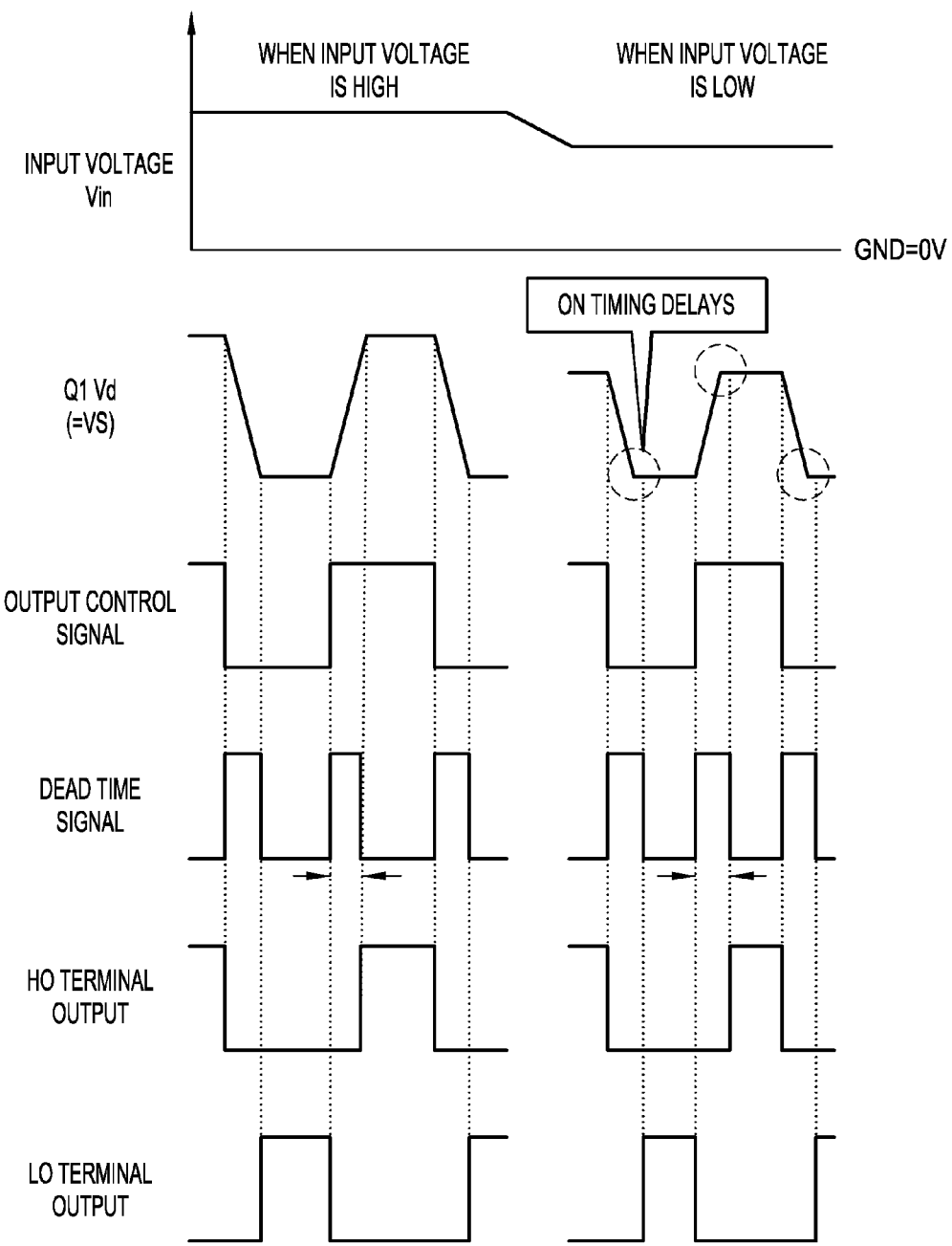
FIG. 15 is a signal waveform diagram for describing problems that occur when the input voltage becomes low.
Figure 16:
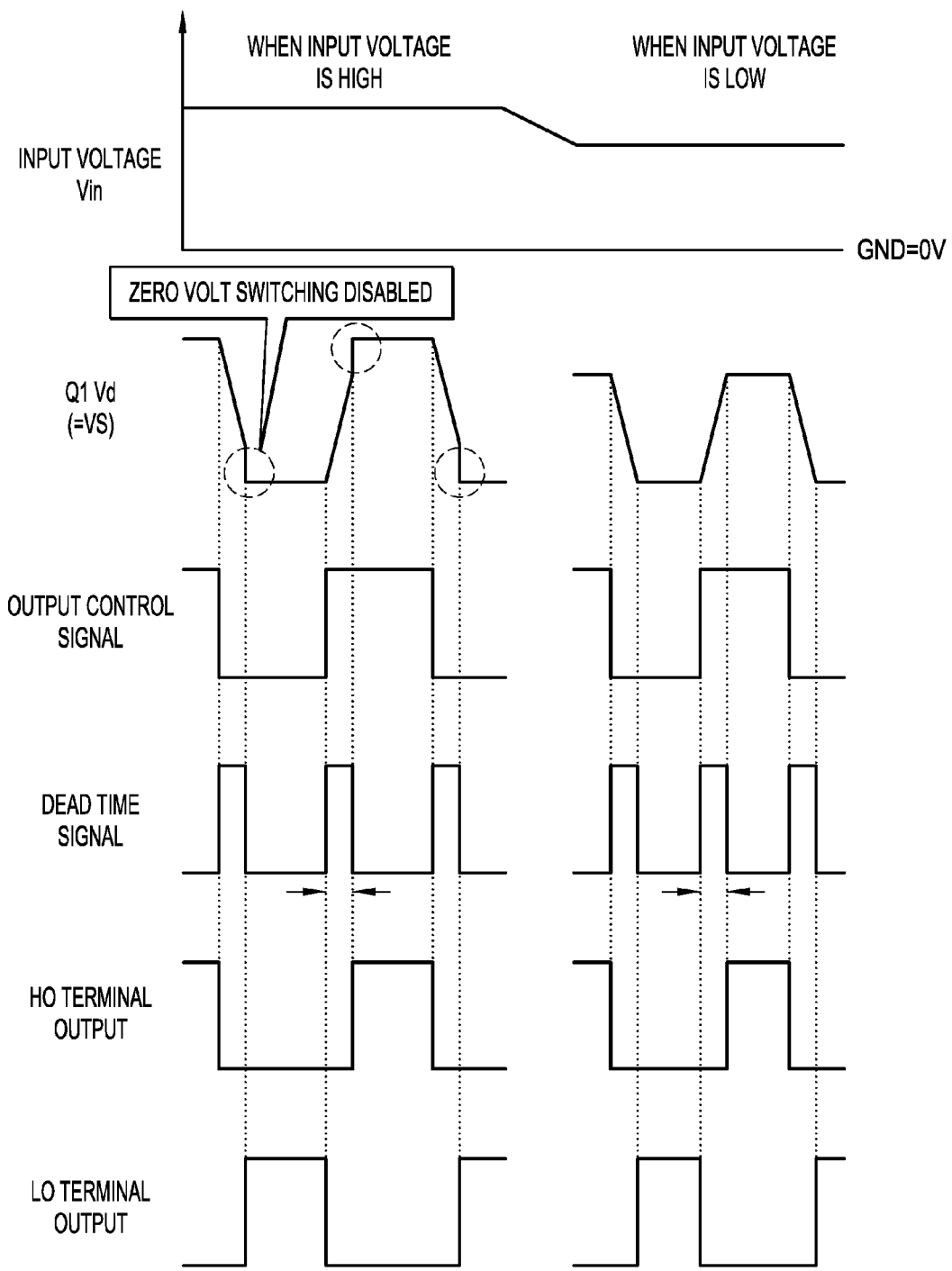
FIG. 16 is a signal waveform diagram for describing problems that occur when the input voltage becomes high.
Figure 17:
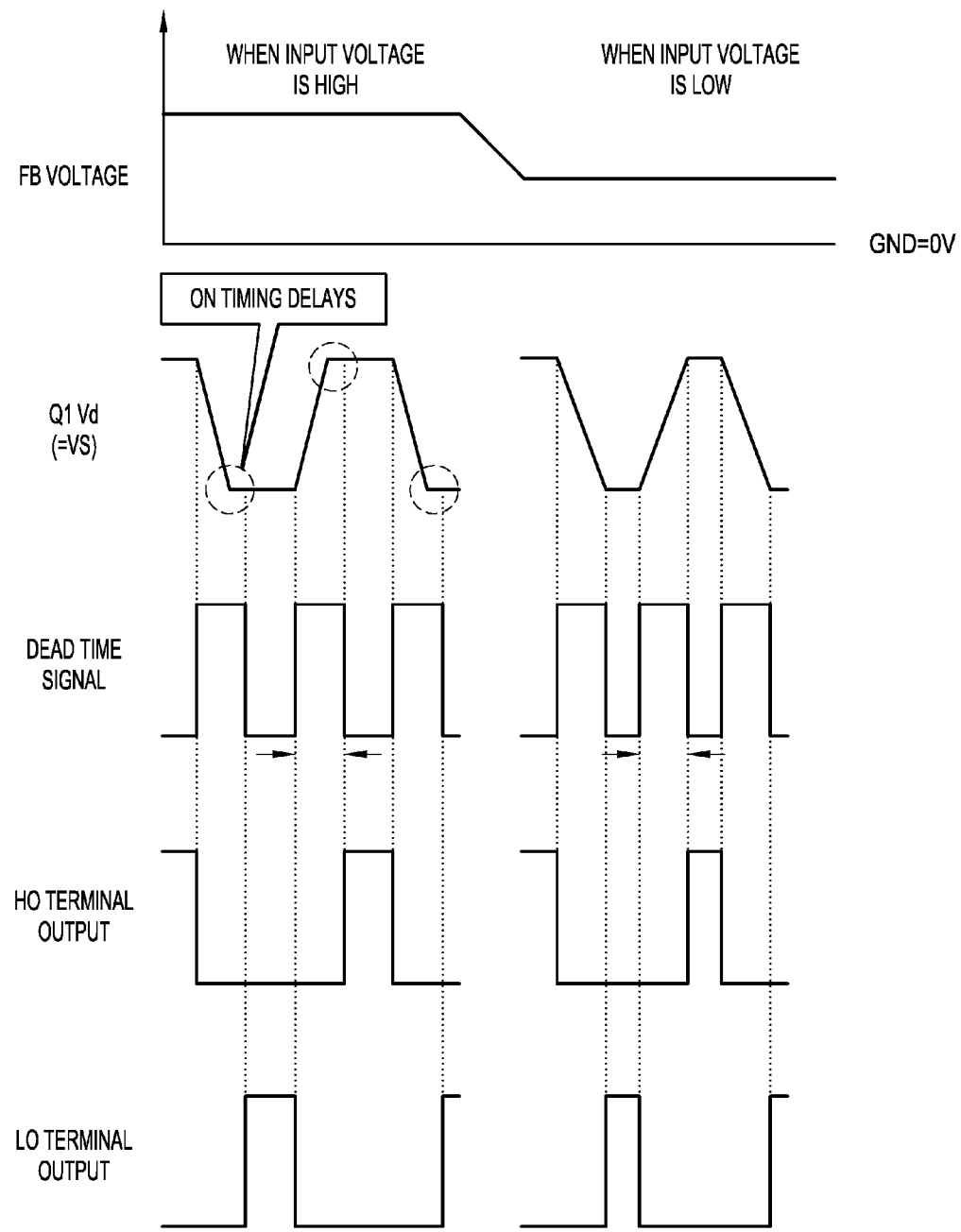
FIG. 17 is a signal waveform diagram for describing problems that occur when the FB voltage becomes high.
Figure 18:
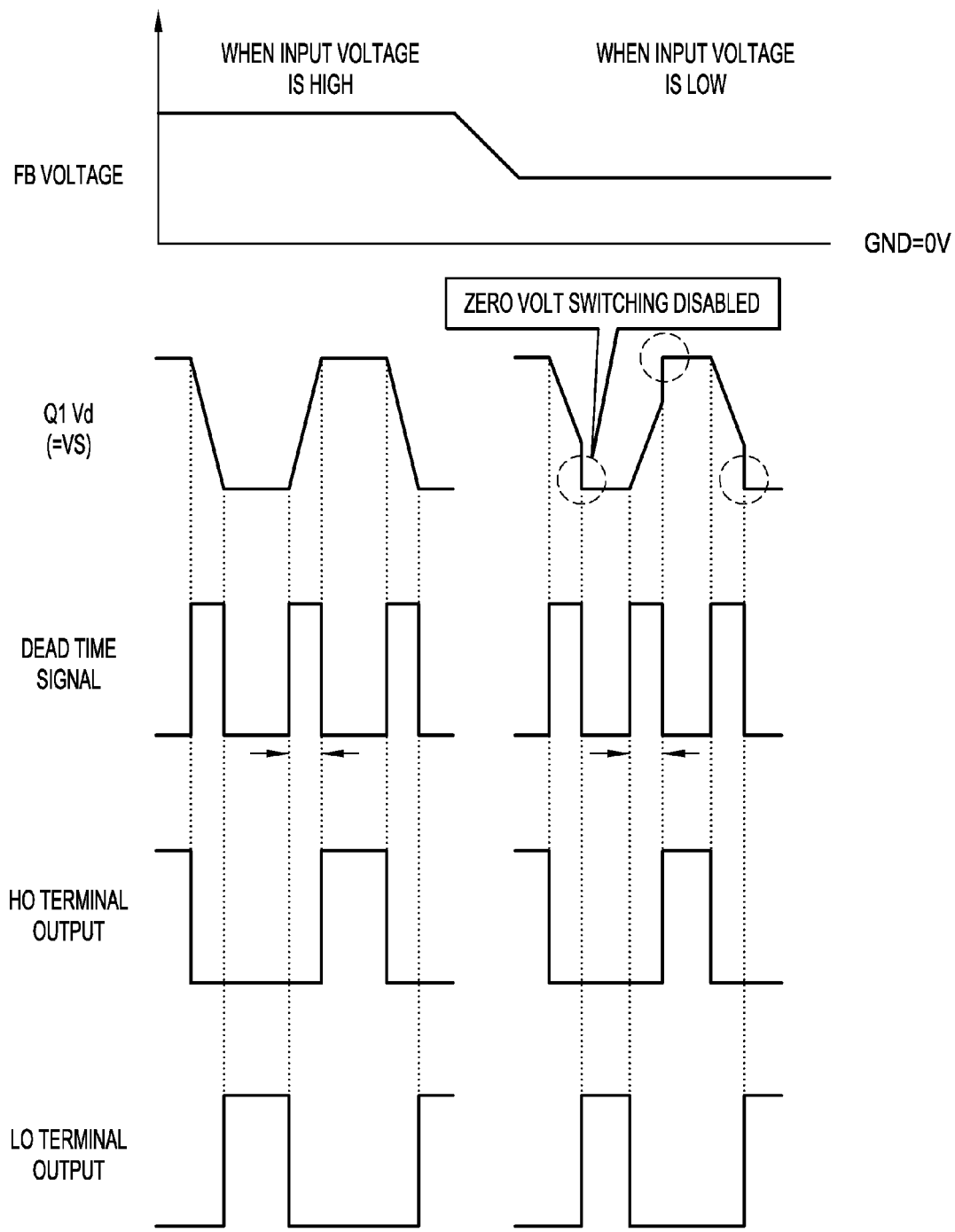
FIG. 18 is a signal waveform diagram for describing problems that occur when the FB voltage becomes low.

In other words, a dead time adjustment circuit 9 is disposed in the drive control circuit A according to this embodiment as an attachment to the dead time circuit 3, as shown in the general configuration of FIG. 2. The dead time adjusting circuit 9 is configured such that the pulse width Tdt of the dead time signal, which is generated by the dead time circuit 3, is adjusted in accordance with the change of the BO voltage. In FIG. 2 as well, a composing element the same as the above mentioned drive control circuit A shown in FIG. 12 is denoted with a same reference symbol, and redundant description on the same composing element is omitted.

Figure 3:
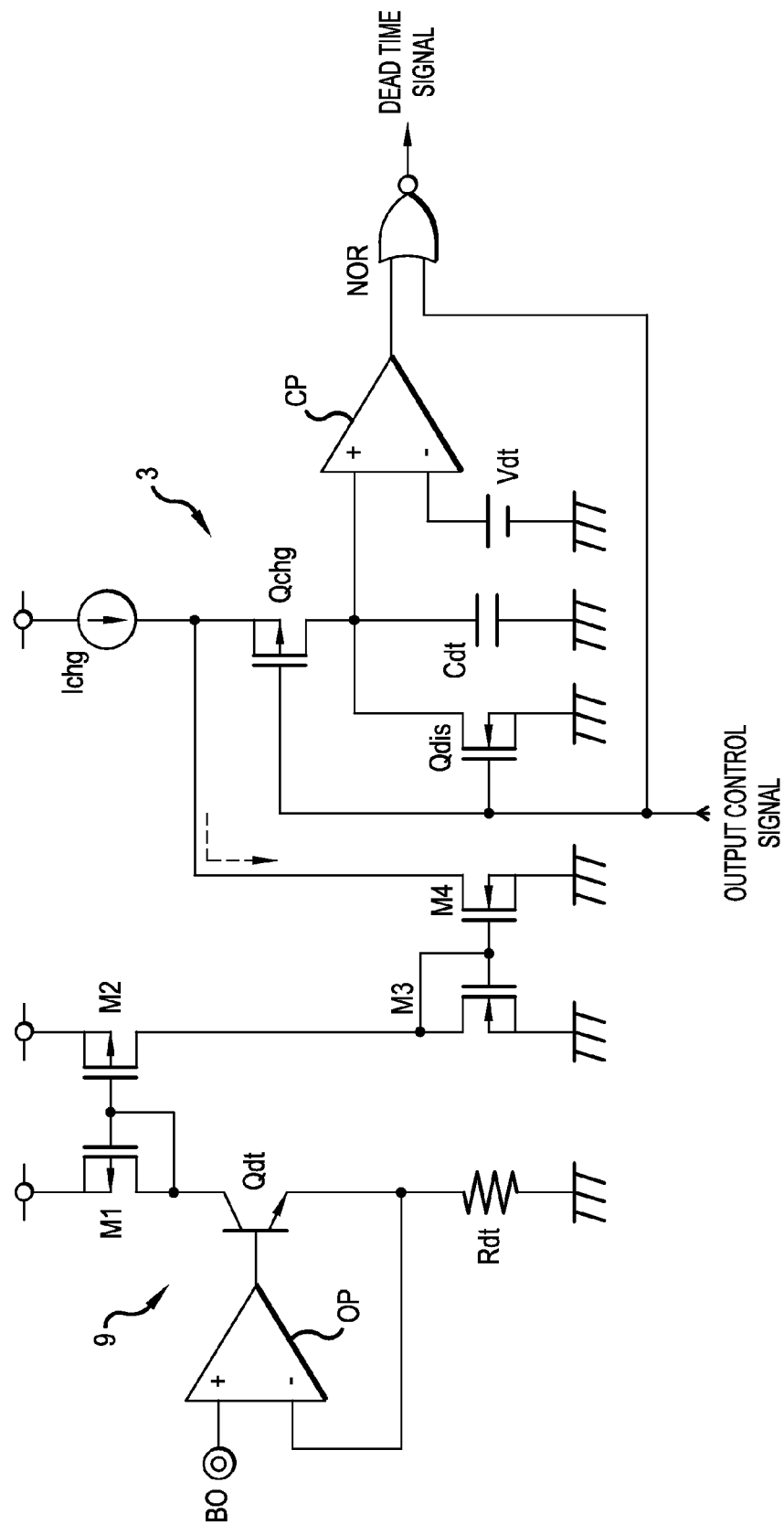
FIG. 3 is a diagram depicting a configuration example of a dead time circuit in the drive control circuit shown in FIG. 2.

Specifically, the dead time circuit 3 and the dead time adjustment circuit 9 are configured as shown in FIG. 3, for example. In FIG. 3, the dead time adjustment circuit 9 includes: a transistor Qdt, which has an emitter resistor Rdt, whereby an emitter-follower circuit is formed; and a differential amplifier OP, which drives the transistor Qdt in accordance with the difference between emitter voltage generated in the emitter resistor Rdt and the BO voltage. The differential amplifier OP decreases the current that flows to the transistor Qdt if the BO voltage is lower than the emitter voltage of the transistor Qdt. On the other hand, the differential amplifier OP increases the current that flows to the transistor Qdt if the BO voltage is higher than the emitter voltage.

A current mirror circuit constituted by a pair of transistors M1 and M2 is connected to a collector of the transistor Qdt. And current in proportion to the current that flows to the transistor Qdt is outputted through the current mirror circuit. Furthermore, a second current mirror circuit constituted by a pair of transistors M3 and M4 is disposed on the output side (transistor M2) of the current mirror circuit. The transistor M2 on the output side of the second current mirror circuit is connected to a constant current source Ichg of the dead time circuit 3. The second current mirror circuit has a role of decreasing the charge current of a charge/discharge capacitor Cdt from the constant current source Ichg by separating a current, which is in proportion to the current that flows to the transistor Qdt, from the constant current source Ichg.

Figure 4:
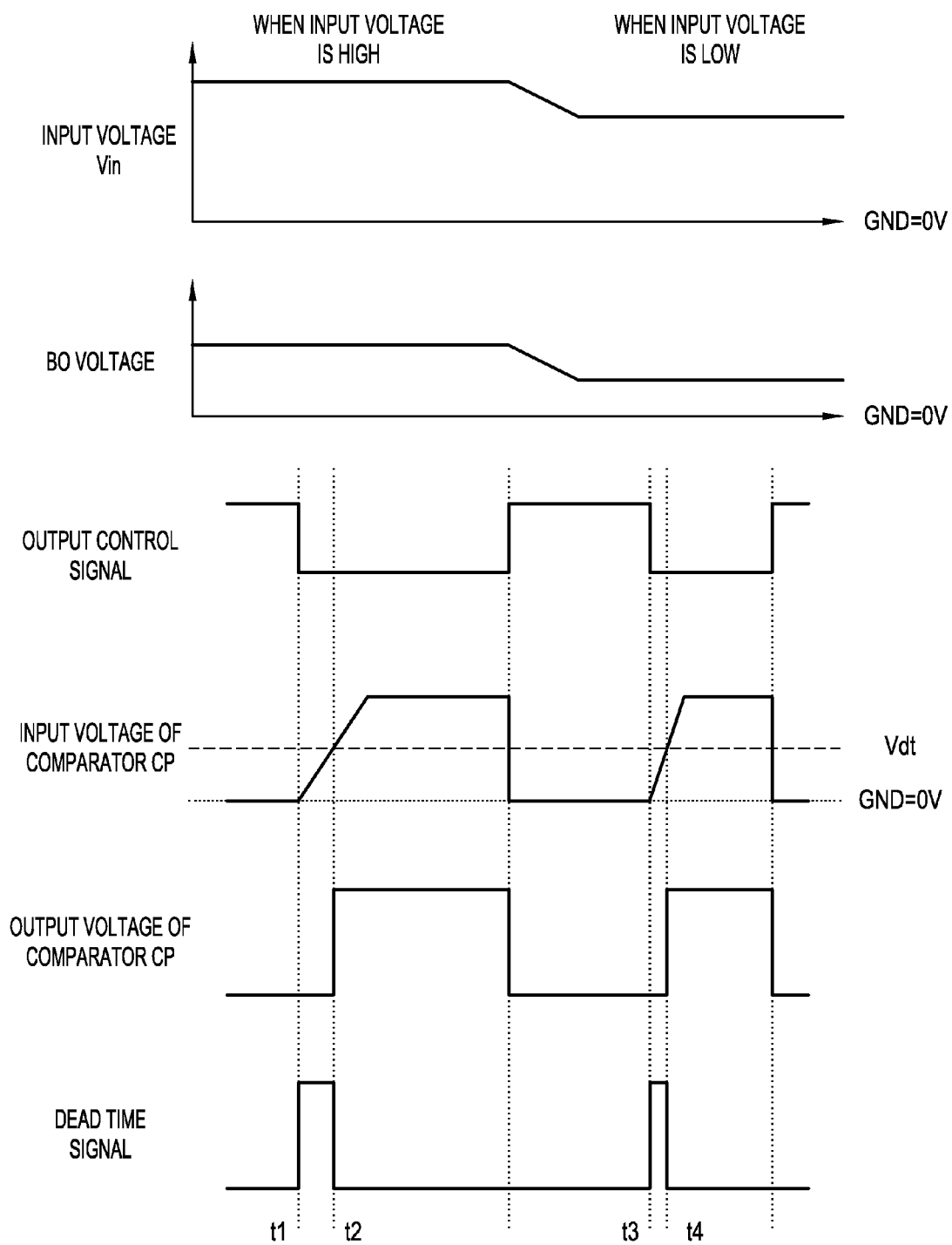
FIG. 4 is a signal waveform diagram for describing operation of the dead time circuit shown in FIG. 3.

According to the dead time adjustment circuit 9 configured like this, if the BO voltage is higher than the emitter voltage of the transistor Qdt, the differential amplifier OP increases the current that flows to the transistor Qdt, so that the amount of current separated from the constant current source Ichg is increased. Then the charge current with respect to the charge/discharge capacitor Cdt is set to be decreased, and the charge voltage Vcd of the charge/discharge capacitor Cdt gradually increases as the t1 in FIG. 4 indicates. This increases the time until the charge voltage Vcd reaches the threshold voltage Vdt as the timing t2 indicates. As a result, the pulse width Tdt of the dead time signal generated by the dead time circuit 3 increases.

If the BO voltage is lower than the emitter voltage of the transistor Qdt, on the other hand, the differential amplifier OP decreases the current that flows to the transistor Qdt, so that the amount of the current separated from the constant current source Ichg decreases. Then the charge current with respect to the charge/discharge capacitor Cdt is set to be higher than the above mentioned case when the BO voltage is high, and the charge voltage Vcd of the charge/discharge capacitor Cdt rapidly increases as the timing t3 in FIG. 4 indicates. This decreases the time until the charge voltage Vcd reaches the threshold voltage Vdt as the timing t4 indicates. As a result, the pulse width Tdt of the dead time signal generated by the dead time circuit 3 decreases.

In other words, the differential amplifier OP of the dead time adjustment circuit 9 configured as above and the transistor Qdt driven by the differential amplifier OP adjust the current that flows to the transistor Qdt in accordance with the BO voltage. If the BO voltage is high, the dead time adjustment circuit 9 increases the output current so as to decrease the charge current of the charge/discharge capacitor Cdt from the constant current source Ichg. If the BO voltage is low, on the other hand, the dead time adjustment circuit 9 decreases the output current, so as to increase the charge current of the charge/discharge capacitor Cdt by the constant current source Ichg.

Figure 5:
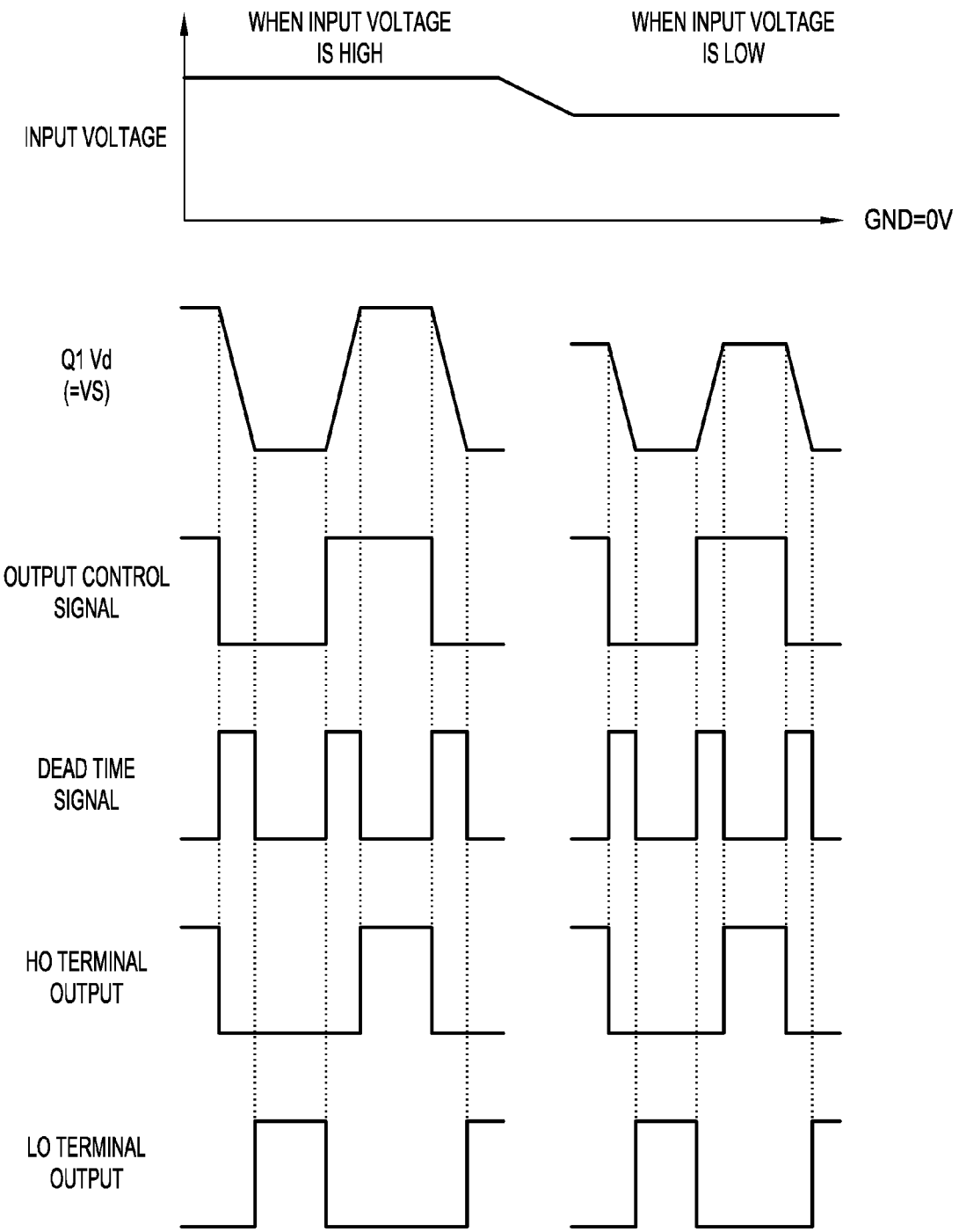
FIG. 5 is a signal waveform diagram for describing operation of the switching power supply apparatus shown in FIG. 1.

According to the switching power supply apparatus that includes the dead time adjustment circuit 9 and which adjusts the pulse width Tdt of the dead time signal generated by the dead time circuit 3 in accordance with the input voltage Vin, that is, in concrete terms in accordance with the BO voltage detected by dividing the input voltage Vin, the problems of the conventional switching power supply apparatus do not occur. In other words, as the operation waveform diagram in FIG. 5 shows, the pulse width Tdt of the dead time signal is adjusted in accordance with the input voltage Vin or the BO voltage. Therefore, unlike a conventional switching power supply apparatus that uses the dead time signal of which pulse width Tdt is fixed, the switching element Q1 or Q2 is not turned ON at a delayed timing than the timing when the voltage applied to the switching element Q1 or Q2 becomes zero. Further, the switching element Q1 or Q2 is not turned ON before the voltage applied to the switching element Q1 or Q2 reaches zero.

Therefore, according to the switching power supply apparatus of this embodiment, the invalid time of power conversion in the switching elements Q1 and Q2 can be minimized regardless the age-based deterioration of the components and the dispersion of component characteristics. Further, loss in the switching elements Q1 and Q2 is decreased, and power conversion efficiency is increased. Moreover, the power conversion efficiency can be improved by a simple configuration of adjusting the pulse width Tdt of the dead time signal in accordance with the BO voltage, and the configuration of the dead time adjustment circuit 9 is also simple, as described above. As a consequence, it is easy to integrate the drive control circuit A including the dead time adjustment circuit 9 into one integrated circuit, which is a huge merit in practical terms. Further, the design specification of the dead time signal that must be met for higher switching frequencies can be relaxed considerably.

The above mentioned switching power supply apparatus according to Embodiment 1 is configured such that the pulse width Tdt of the dead time signal is adjusted in accordance with the input voltage Vin or the BO voltage. However the switching power supply apparatus may also be configured such that the pulse width Tdt of the dead time signal is adjusted in accordance with the change of the output voltage Vout or the change of the FB voltage caused by the change of the input voltage Vin, or by the change of the FB voltage that is caused by the change of the output voltage Vout.

Figure 6:
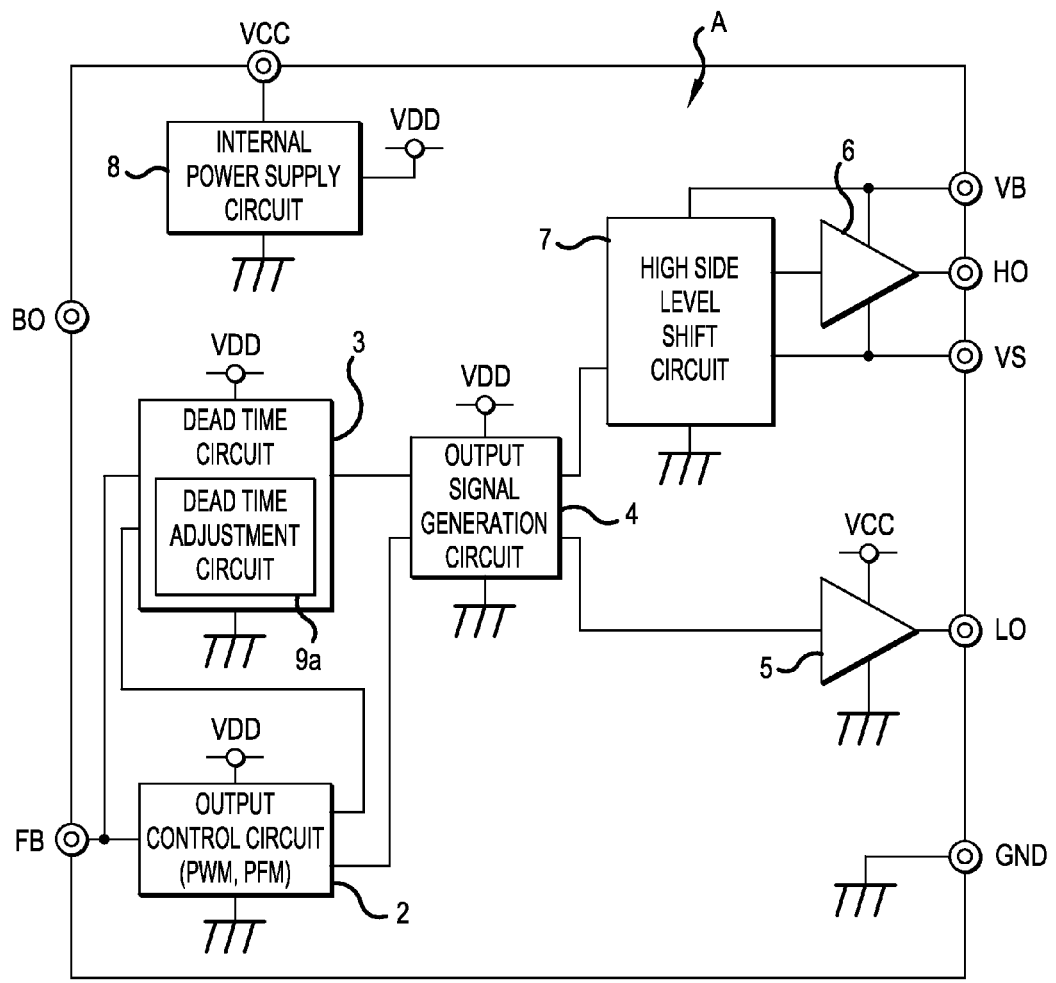
FIG. 6 is a schematic block diagram of a drive control circuit which is incorporated in a switching apparatus according to Embodiment 2 of the present invention.

FIG. 6 is a schematic block diagram of a drive control circuit A of a switching power supply apparatus according to Embodiment 2, which is configured to adjust the pulse width Tdt of the dead time signal in accordance with the change of the FB voltage. In the drive control circuit A, a dead time adjustment circuit 9a is disposed as an attachment to the dead time circuit 3. In the dead time adjustment circuit 9a, the pulse width Tdt of the dead time signal generated by the dead time circuit 3 is adjusted in accordance with the change of the FB voltage. In FIG. 6 as well, a same composing element as the above mentioned drive control circuit A shown in FIG. 12 is denoted with a same reference symbol, and redundant description on the same composing element is omitted.

Figure 7:
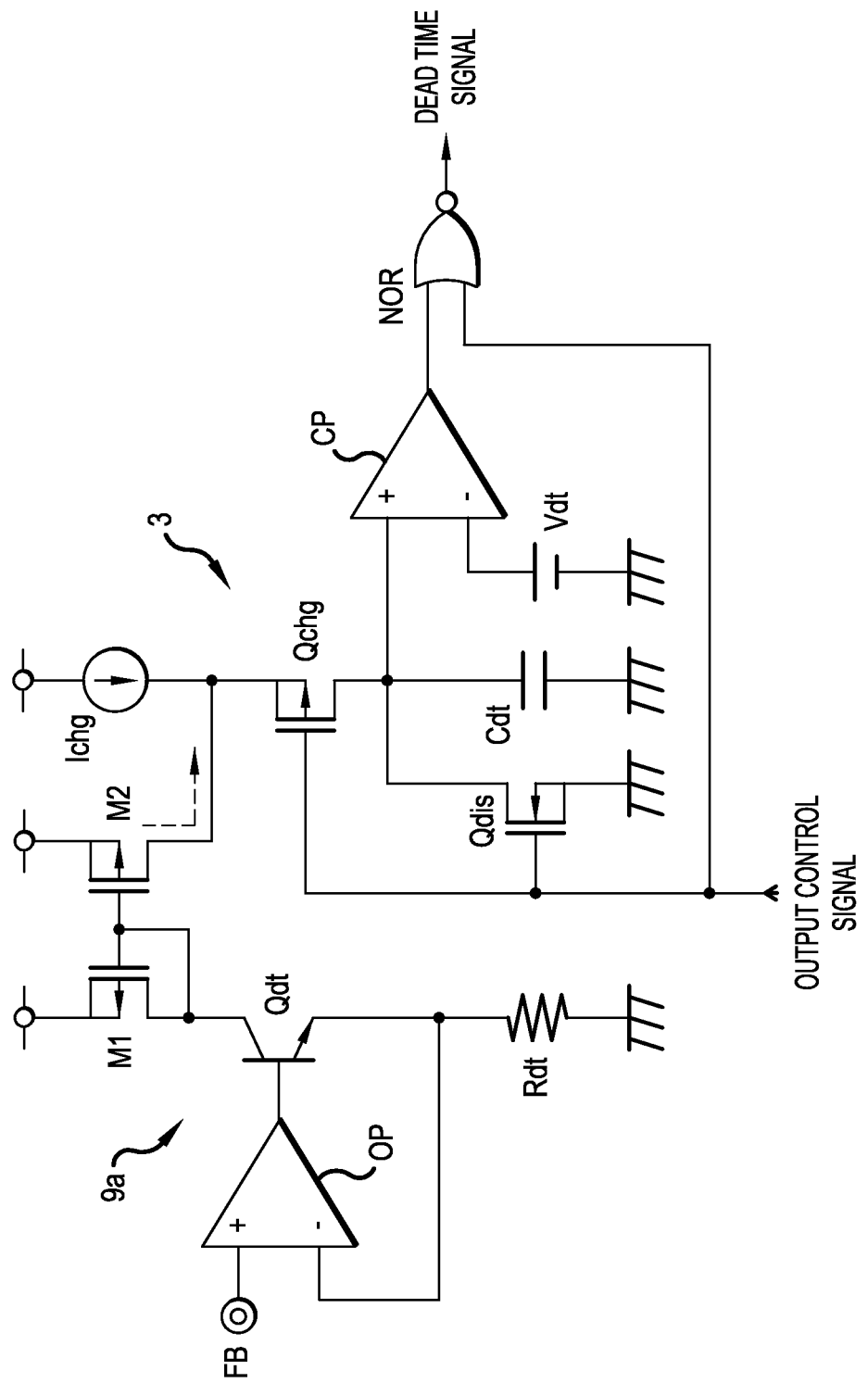
FIG. 7 is a diagram depicting a configuration example of a dead time circuit in the drive control circuit shown in FIG. 6.

Specifically, the dead time circuit 3 and the dead time adjustment circuit 9a are configured as shown in FIG. 7, for example. Just like the dead time adjustment circuit 9 shown in FIG. 3, the dead time adjustment circuit 9a includes: a transistor Qdt, which has an emitter resistor Rdt, whereby an emitter-follower circuit is formed; and a differential amplifier OP. This differential amplifier OP drives the transistor Qdt in accordance with the difference between emitter voltage generated in the emitter resistor Rdt and the FB voltage. In concrete terms, the differential amplifier OP decreases the current that flows to the transistor Qdt if the FB voltage is lower than the emitter voltage of the transistor Qdt, and increases the current that flows to the transistor Qdt if the FB voltage is higher than the emitter voltage.

In a collector of the transistor Qdt, a current mirror circuit constituted by a pair of transistors M1 and M2 is disposed. Current in proportion to the current that flows to the transistor Qdt is outputted from the transistor M2 through the current mirror circuit. The transistor M2 of the current mirror circuit is used as a current source which is disposed in parallel with the constant current source Ichg of the dead time circuit 3. In other words, the current mirror circuit of the dead time adjustment circuit 9a, which adds current, in proportion to the current that flows to the transistor Qdt, to the constant current source Ichg, plays a role of increasing charge current to the charge/discharge capacitor Cdt.

Figure 8:
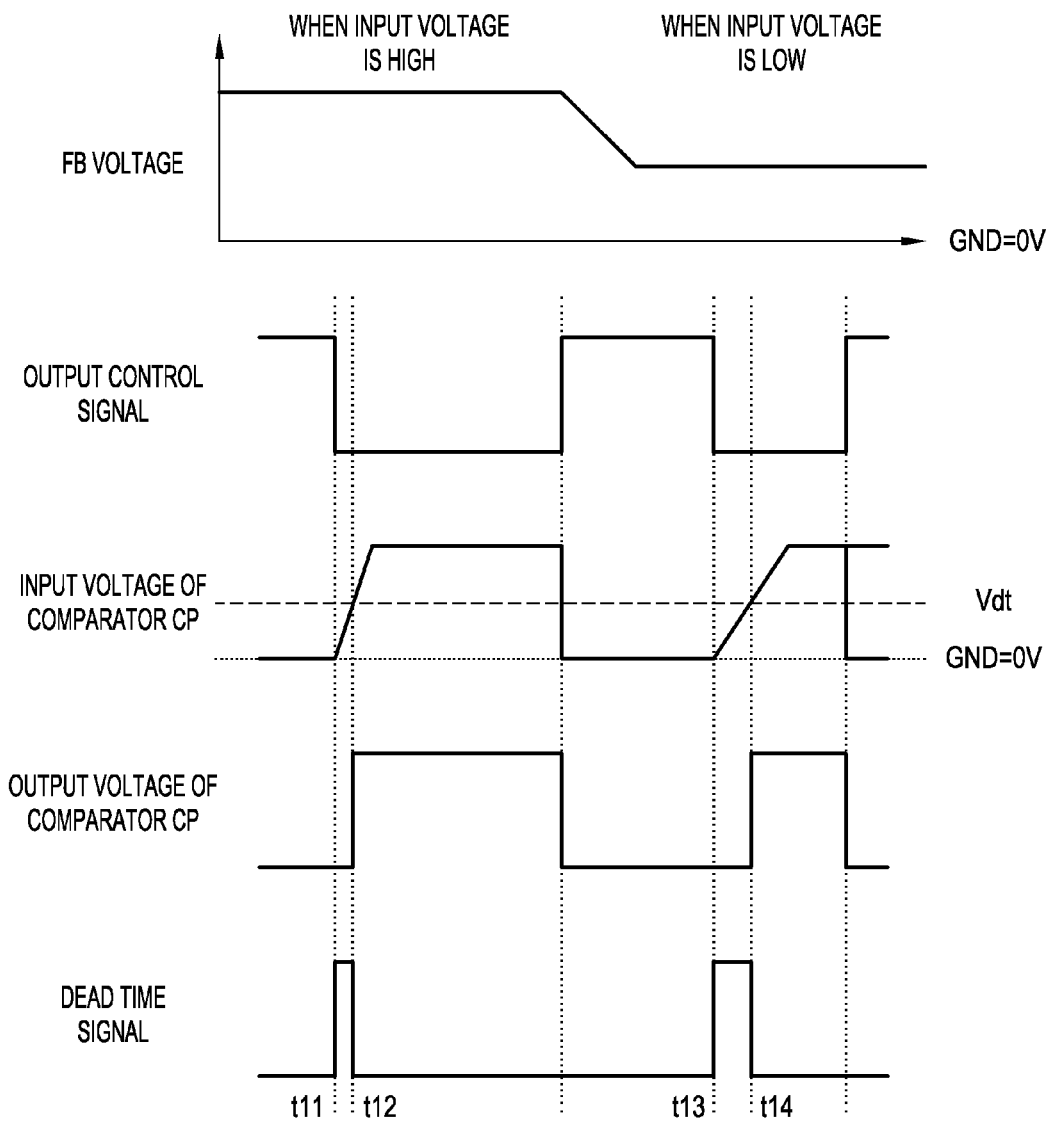
FIG. 8 is a signal waveform diagram for describing operation of the dead time circuit shown in FIG. 7.

According to the dead time adjustment circuit 9a configured like this, if the FB voltage is higher than the emitter voltage of the transistor Qdt, the differential amplifier OP increases the current that flows to the transistor Qdt, so that the amount of current that is added to the current supplied from the constant current source Ichg is increased. Then the charge current with respect to the charge/discharge capacitor Cdt is set to be increased, and the charge voltage Vcd of the charge/discharge capacitor Cdt rapidly increases as the timing t11 in FIG. 8 indicates. This decreases the time until the charge voltage Vcd reaches the threshold voltage Vdt as the timing t12 indicates. As a result, the pulse width Tdt of the dead time signal generated by the dead time circuit 3 decreases.

If the FB voltage is lower than the emitter voltage of the transistor Qdt, on the other hand, the differential amplifier OP decreases the current that flows to the transistor Qdt, so that the amount of the current that is added to the current supplied from the constant current source Ichg decreases. Then the charge current with respect to the charge/discharge capacitor Cdt is set to be lower than the above mentioned cased when the FB voltage is high, and the charge voltage Vcd of the charge/discharge capacitor Cdt gradually increases as the timing t13 in FIG. 8 indicates. This increases the time until the charge voltage Vcd reaches the threshold voltage Vdt as the timing t14 indicates. As a result, the pulse width Tdt of the dead time signal generated by the dead time circuit 3 increases.

In other words, the differential amplifier OP of the dead time adjustment circuit 9a configured as above and the transistor Qdt driven by the differential amplifier OP adjust the current that flows to the transistor Qdt in accordance with the FB voltage. If the FB voltage is high, the dead time adjustment circuit 9a increases the output current, so as to increase the charge current of the charge/discharge capacitor Cdt by the constant current source Ichg. If the FB voltage is low, on the other hand, the dead time adjustment circuit 9a decreases the output current, so as to decrease the charge current of the charge/discharge capacitor Cdt from the constant current source Ichg.

Figure 9:
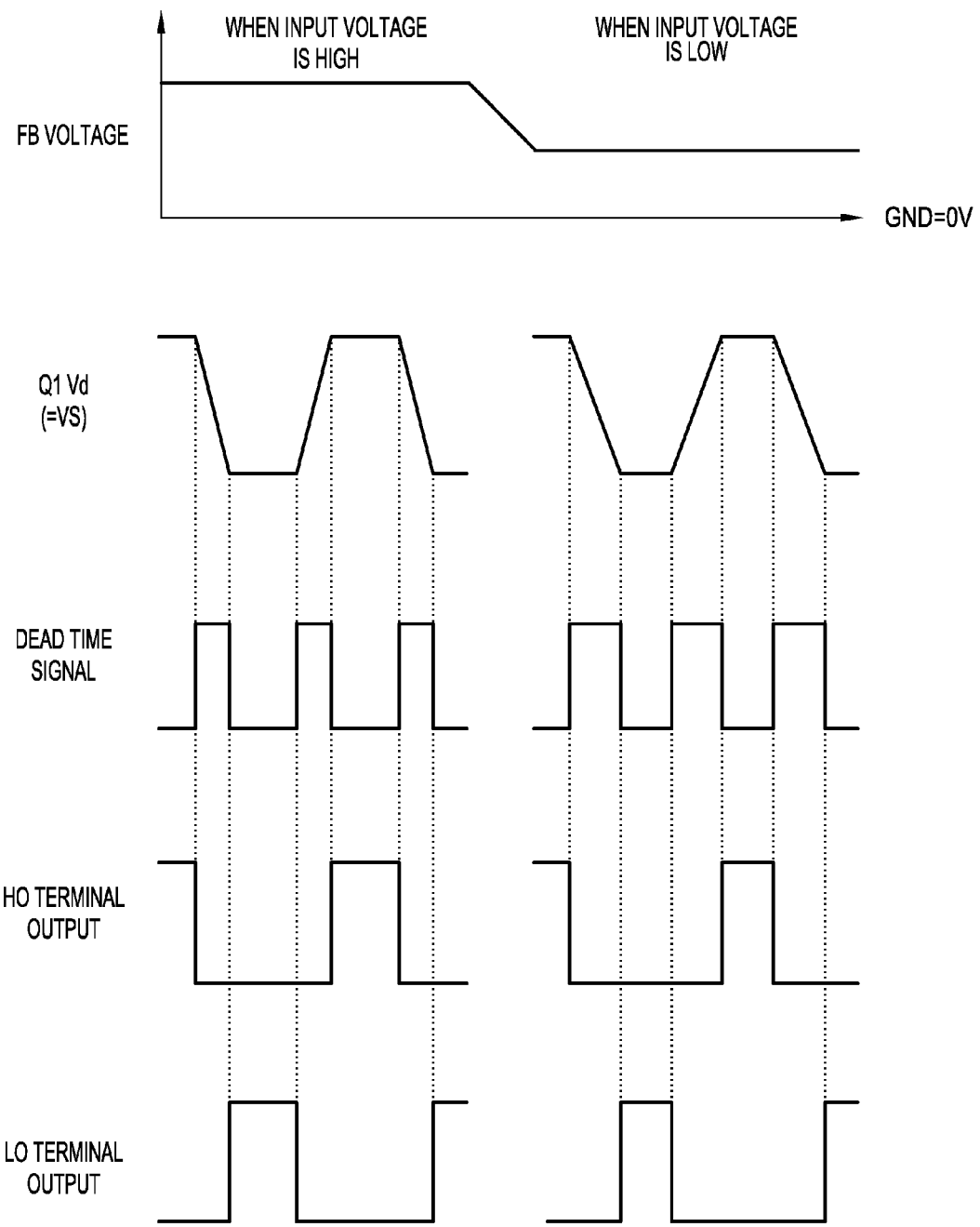
FIG. 9 is a signal waveform diagram for describing operation of the switching power supply apparatus including the drive control circuit shown in FIG. 6.

According to the switching power supply apparatus that includes the dead time adjustment circuit 9a and which adjusts the pulse width Tdt of the dead time signal generated by the dead time circuit 3 in accordance with the output voltage Vout, that is, in concrete terms in accordance with the FB voltage, the problems of the conventional switching power supply apparatus do not occur. In other words, as the operation waveform diagram in FIG. 9 shows, the pulse width Tdt of the dead time signal is adjusted by the FB voltage in accordance with the output voltage Vout. Therefore, unlike the conventional switching power supply apparatus that uses the dead time signal of which pulse width Tdt is fixed, the switching element Q1 or Q2 is not turned ON at a delayed timing than the timing when the voltage applied to the switching element Q1 or Q2 becomes zero. Further, the switching element Q1 or Q2 is not turned ON before the voltage applied to the switching element Q1 or Q2 reaches zero.

Therefore, according to the switching power supply apparatus of Embodiment 2 as well, the invalid time of power conversion in the switching elements Q1 and Q2 can be minimized regardless the age-based deterioration of the components and dispersion of component characteristics, just like Embodiment 1. Further, loss in the switching elements Q1 and Q2 can be decreased, and power conversion efficiency is increased. Moreover, the power conversion efficiency can be improved by a simple configuration of adjusting the pulse width Tdt of the dead time signal in accordance with the FB voltage, and the configuration of the dead time adjustment circuit 9a is also simple, as described above. As a consequence, it is easy to integrate the drive control circuit A including the dead time adjustment circuit 9a into one integrated circuit, which is a huge merit in practical terms. Further, the design specification of the dead time signal, that must be met for higher switching frequencies, can be relaxed considerably.

The above mentioned Embodiment 1 and Embodiment 2 are applied to a switching power supply apparatus where the resonance type converter is constructed, but embodiments of the present invention can also be applied to a switching power supply apparatus where a synchronous rectification boost converter is constructed.

Figure 10:
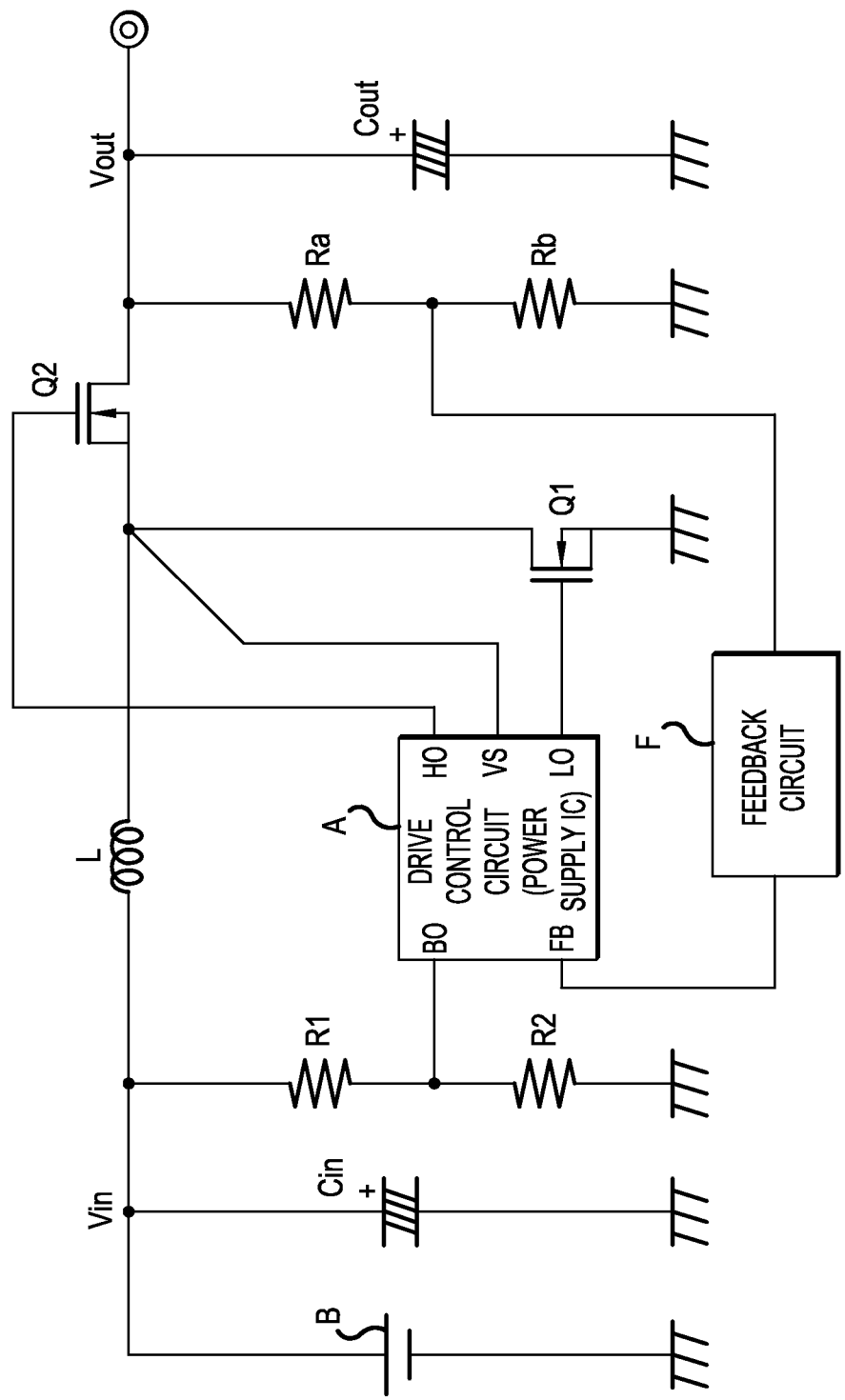
FIG. 10 is a schematic block diagram of a switching power supply apparatus constructing a synchronous rectification boost converter according to Embodiment 3 of the present invention.

FIG. 10 is a schematic block diagram of a switching power supply apparatus according to Embodiment 3 of the present invention, and the switching power supply apparatus is constructed by a synchronous rectification boost converter. The synchronous rectification boost converter includes: a first switching element Q1 that is connected to a DC voltage source B via an inductor L, and stores power in the inductor L when the switching element Q1 is turned ON; and a second switching element Q2 that turns ON when the first switching element Q1 is OFF, and transfers the power stored in the inductor L to the output capacitor Cout using resonance of the inductor L, so as to obtain the output voltage Vout.

The first and second switching elements Q1 and Q2 are alternately turned ON/OFF by the drive control circuit A, just like Embodiments 1 and 2 described above. The synchronous rectification boost converter shown in FIG. 10 is configured such that the output voltage Vout is divided and detected via the voltage dividing resistors Ra and Rb and generates the FB voltage, which is fed back to the drive control circuit A via a feedback circuit F (e.g. photocoupler). BO voltage detected by dividing the input voltage Vin using the voltage dividing resistors R1 and R2 is inputted to the drive control circuit A, just like Embodiments 1 and 2.

In the switching power supply apparatus where the synchronous rectification boost converter is constructed as well, it is necessary to improve power conversion efficiency by turning the switching elements Q1 and Q2 ON/OFF at optimum timings. Therefore, the pulse width Tdt of the dead time signal must be optimized, just like the above mentioned switching power supply apparatus where the resonance type converter is constructed. The drive control circuit A according to this embodiment also includes the dead time circuit 3 and the dead time adjustment circuit 9 or 9a, which are configured as shown in FIG. 3 or FIG. 7, just like Embodiments 1 and 2.

Since each switching element Q1 and Q2 is turned ON and OFF by the drive control circuit A, that includes the dead time circuit 3 and the dead time adjustment circuit 9 or 9a, invalid time of power conversion in the switching elements Q1 and Q2 can be minimized, just like Embodiments 1 and 2. Further, loss in the switching elements Q1 and Q2 is decreased, and power conversion efficiency is increased. Therefore, effects similar to Embodiments 1 and 2 can be implemented.

The present invention is not limited to the embodiments described above. For example, the present invention can be applied just the same to any switching circuit that obtains voltage control output by the drive control circuit A alternately turning the first switching element Q1 on the low side and the second switching element Q2 on the high side ON/OFF. In concrete terms, the present invention can be widely applied to, for example, an inverter for driving a motor, step up/down chopper circuit, and a drive control circuit, such as a drive circuit unit of an inverter fluorescent light or a charge/discharge control unit of an uninterrupted power source apparatus (UPS).

Whether the pulse width Tdt of the dead time signal is adjusted based on the BO voltage or whether the pulse width Tdt of the dead time signal is adjusted based on the FB voltage can be satisfactorily determined in accordance with the specification. Further, the adjustment width of the pulse width Tdt can also be determined in accordance with the characteristics of the switching elements Q1 and Q2. The present invention may be modified in various ways within a scope that does not depart from the true spirit of the invention.

The invention claimed is:

1. A switching power supply apparatus, comprising:
   a resonance type power convertor main unit that provides a DC output power and comprises a first switching element that switches a DC input power and stores the power in an inductor, and a second switching element that transfers the power stored in the inductor to an output capacitor using resonance of the inductor;
   a drive control circuit that resonates the inductor by alternately turning the first and second switching elements on and off; and
   a feedback circuit that controls the operation of the drive control circuit by detecting an output voltage of the output capacitor and providing feedback, corresponding to the detected output voltage, to the drive control circuit, wherein
   the drive control circuit comprises:
   an output control circuit that generates an output control signal having a pulse width in accordance with the feedback from the feedback circuit;
   a dead time circuit that, on the basis of a turn OFF timing of one of the first and second switching elements, generates a dead time signal to specify a turn ON timing of the other one of the first and second switching elements, on the basis of the output control signal;
   an output signal generation circuit that generates first and second output signals for specifying the ON time of the first and second switching elements respectively in accordance with the output control signal and the dead time signal; and a dead time adjustment circuit that adjusts a turn ON timing of the first and second switching elements by changing a time width of the dead time signal in accordance with a detected voltage of the DC input power such that in a case where a magnitude of the detected voltage of the DC input power exceeds a voltage at a first node, the time width of the dead time signal has a first value, and in a case where the magnitude of the detected voltage of the DC input power is less than the voltage at the first node, the time width of the dead time signal has a second value different from the first value.

2. The switching power supply apparatus according to claim 1, wherein
the resonance type power converter main unit is constituted by a resonance type converter comprising:
a series resonance circuit comprising the inductor, which is a leakage inductor of an insulation transformer and a capacitor, with a primary winding of the insulation transformer being connected to a DC voltage source via the capacitor;
the first switching element;
the second switching element; and
a diode that rectifies power generated on a secondary winding side of the insulation transformer,
wherein the output capacitor is configured to smooth the power rectified via the diode and output the power,
wherein the first switching element is configured to apply an input voltage from the DC voltage source to the series resonance circuit when the first switching element is turned ON by the drive control circuit, and
wherein the second switching element that is connected to the series resonance circuit in parallel, and is turned ON by the drive control circuit when the first switching element is OFF, so as to form a current path of the series resonance circuit.

3. The switching power supply apparatus according to claim 1, wherein:
the resonance type power converter main unit is constituted by a synchronous rectification boost converter,
the first switching element is connected to a DC voltage source via a reactor for resonance, and applies input voltage from the DC voltage source to the reactor for resonance when the first switching element is turned ON by the drive control circuit, and
the second switching element is turned ON by the drive control circuit when the first switching element is OFF, so as to transfer power energy stored in the reactor for resonance to an output capacitor.

4. The switching power supply apparatus according to claim 1, wherein
the output signal generation circuit generates a first output signal having a pulse width with which the fall of the dead time signal, when the output control signal is OFF, is an ON trigger, and the rise of the output control signal is an OFF trigger, and also generates a second output signal having a pulse width with which the fall of the dead time signal, when the output control signal is ON, is an ON trigger, and the rise of the output control signal is an OFF trigger.

5. The switching power supply apparatus according to claim 1, wherein
the dead time circuit comprises a comparator that compares a charge voltage of a capacitor, which is charged when the output control signal is OFF, with a comparative reference voltage, and generates a dead time signal having a pulse width corresponding to a period from a fall timing of the output control signal to a timing when the output signal of the comparator is inverted, and
the dead time adjustment circuit changes the pulse width of the dead time signal by adjusting the charge current of the capacitor in accordance with the detected voltage of the DC input power.

6. The switching power supply apparatus according to claim 5, wherein
the dead time adjustment circuit sets the pulse width of the dead time signal to be longer by decreasing the charge current of the capacitor in the case where the magnitude of the detected voltage of the DC input power exceeds the voltage at the first node, and sets the pulse width of the dead time signal to be shorter by increasing the charge current of the capacitor in the case where the magnitude of the detected voltage of the DC input power is less than the voltage at the first node.

* * * * *